United States Patent Office 2,706,507
Patented Apr. 19, 1955

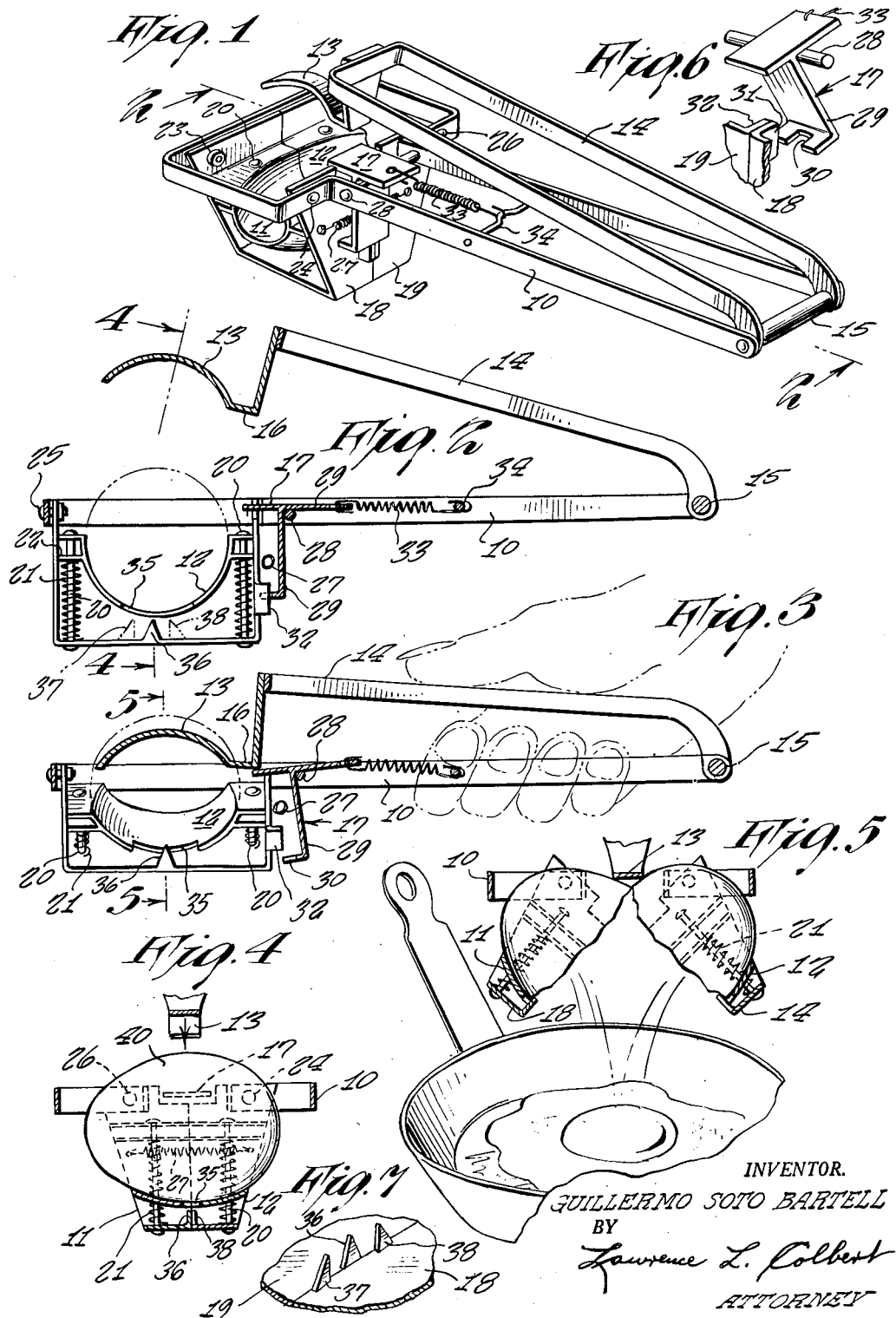

2,706,507

EGG BREAKER

Guillermo Soto Bartell, Nogales, Sonora, Mexico, assignor of one-half to John D. Singh Application September 28, 1953, Serial No. 382,511

4 Claims. (Cl. 146—2)

This invention relates to an egg breaker.

It is an object of the present invention to provide a device for parting in half and emptying an egg instantly and in one operation and avoiding at the same time the soiling of the hands.

It is another object of the invention to provide in an egg breaker a member adapted to be pressed against the egg to urge the egg against pointed projections and wherein automatically upon the egg having been cracked by the projections and not until this has been positively effected, releasing the pivotal sections from one another automatically while retaining the egg halves, causing the egg contents to be spilled from the separate halves and wherein upon return of the separable parts, the same will be automatically locked to retain an egg until again depressed by the pressure member engaging with the egg and with the release means to again permit the separation of the breaker parts.

Other objects of the invention are to provide an egg breaker which is of simple construction, has a minimum number of parts, inexpensive to manufacture, automatic in operation, durable, compact, convenient to use and efficient in operation.

For other objects and for a better understanding of the invention, reference may be had to the following detailed description taken in connection with the accompanying drawing, in which:

Figure 1 is a perspective view of the egg breaker embodying the features of the present invention;

Fig. 2 is a longitudinal sectional view taken on line 2—2 of Fig. 1 with the pushing lever elevated;

Fig. 3 is a longitudinal sectional view similar to Fig. 2, with the pushing member depressed and engaging with the release means that holds the separable parts together;

Fig. 4 is a vertical sectional view taken generally on line 4—4 of Fig. 2 with an egg in place in the separable supporting parts;

Fig. 5 is a vertical sectional view taken on line 5—5 of Fig. 3 with the separable parts separated to an extent to spill the egg into the frying pan;

Fig. 6 is a perspective view of the release means for the separable parts;

Fig. 7 is a fragmentary perspective view of the knife or pointed projections which penetrate the egg shell to start the separation of the same into halves.

Referring now to the figures, 10 represents a frame for supporting separable egg supporting members 11 and 12 adapted to receive an egg and support the same until depressed by a pusher plate 13 carried on a top frame 14 pivoted by a pin 15 on the outer end of the bottom frame 10. The frames 10 and 14 provide a handle which can be gripped to support the breaker and the egg and to permit the egg to be carried to and over a frying pan. The pusher plate 13 is curved to fit the contour of the egg and has a shoulder portion 16 adapted to engage a release device 17.

The parts 11 and 12 are respectively fastened on depending U-shaped separable members 18 and 19 by spring pin mounting devices 20. These spring pin mounting devices are arranged in pairs and extend upwardly from the lower ends of the members 18 and 19, there being a pair of these spring mounting pins on each member 18 and 19. Each spring pin mounting device includes a compression spring 21 on which is supported flange 22 of the egg supporting members 11 and 12.

The separable member 18 is pivotally connected by pins 23 and 24 to the bottom frame 10 which is enlarged at its outer end to receive the members 18 and 19. The member 19 is pivotally connected to the enlarged part of the bottom frame 10 by pivot pins 25 and 26. The members 18 and 19 are accordingly hingedly connected to the frame 10 and can be separated from one another. The separable members 18 and 19 are urged toward one another by a tension spring 27 and are normally held against outward displacement from one another by the release means 17. The release means 17 is pivoted on pin 28 extending between the sides of the frame 10 a horizontal portion 29 that is engaged by the shoulder 16 of the egg pusher plate 13 and a depending portion 29 that is notched as indicated at 30 to receive projections 31 and 32 of the respective separable members 18 and 19. As long as the pusher plate 13 is elevated, as shown in Fig. 2, the separable members 18 and 19 will be locked together by the release device 17.

A tension spring 33 is connected between the horizontal portion 29 of the release device 17 and a transverse rod 34 extending between the sides of the frame 10.

The spring mounted egg supporting members 11 and 12 are respectively recessed along their opposing edges as at 35 to receive pointed knife projections 36 for the purpose of piercing the egg shell together with knife projections 37 and 38.

The knife projection 36 is carried on the separable member 19 and the knife projections 37 and 38 are carried on the separable member 18.

In use the egg is inserted in the egg supporting members 11 and 12 as indicated at 40. When in this position the egg supporting members 11 and 12 are elevated by the spring pin devices 20 above the knife projections 36, 37 and 38. Thereafter the top or pusher plate frame 14 will be depressed to engage the egg so as to cause the egg to be pushed downwardly against the action of the springs 21 of the spring pin devices until the knife projections enter the recesses 35 and penetrate the egg shell in the manner as illustrated in Fig. 3. The shoulder 16 on the pusher plate 13 will then engage release device 17 so that with the egg shell having been punctured along the center thereof, a continued pressure upon the egg shell will cause the outward pivotal movement of the separable members 18 and 19 in the manner as shown in Fig. 5 so that the contents of the egg may be dropped into a frying pan. After the contents of the egg has been delivered to the pan and the thumb pressure released from the pusher plate frame 14, the separable members 18 and 19 will be drawn together by the tension spring 27 and the egg shell halves can be ejected from the spring mounted supports 11 and 12 by merely elevating the pusher plate 13 to a sufficient extent and turning over the frame 10 to dump out the shells. Thereafter, another egg can be placed in the supports 11 and 12.

It should now be apparent that there has been provided an egg breaker device wherein the egg once in the device can be easily broken and its contents drained into a frying pan without the user of the device having to soil her hands while opening the egg.

While various changes may be made in the detail construction, it shall be understood that such changes shall be within the spirit and scope of the present invention as defined by the appended claims.

What is claimed is:

1. An egg breaking device comprising a bottom frame, separable members hinged to said bottom frame said separable members having opposing edges and at least one knife projection on each of said edges, egg supporting members having opposing recessed edges respectively contained in the separable members and spring pin means on the separable members to support the egg supporting members above the respective separable members, a top frame hinged to said bottom frame pusher plate means connected to the top frame for movement therewith adapted to engage the upper side of an egg when in the egg supporting members to force the separable members and knife projections on the separable members through the recessed edges of the egg supporting members to penetrate the egg upon continued movement of the pusher plate means upon the egg, said separable members being moved apart from one another under the force of the pusher plate means and egg to permit the discharge of the contents of the egg, from the egg halves.

2. An egg breaking device as defined in claim 1, and having release means pivotally mounted on the bottom frame and engageable with the separable members to normally hold the same against separation, said release means, having a portion engageable with said pusher plate means upon downward movement thereof, whereby the separable members are released.

3. An egg breaker device as defined in claim 2, and said release means comprising a pivot pin extending between the sides of the bottom frame and pivotable therein, a horizontal portion and a depending vertical portion having a notch therein, said separable members having projections thereon adapted to join with one another and to be retained in the notch in the depending vertical portion and said horizontal portion extending into the enlargement of the frame, said pusher plate having a shoulder thereon engageable with said horizontal release means portion to pivot said release means and the depending portion outwardly from the projections of the separable members, a tension spring connected to the horizontal release means portion and anchored upon the bottom frame and urging the downward pivotal movement of the release means toward the separable members, and tension spring means extending between the separable members to normally urge the same together.

4. An egg breaker device comprising a bottom handle frame having an enlarged portion thereon, separable members having opposing edges and pivotally mounted in the enlarged portion for outward separation from one another, egg supporting members disposed respectively in the separable members, pin spring devices respectively for supporting the egg supporting members to permit relative movement in the egg supporting members in the separable members, said egg supporting members being recessed along their opposing edges, said separable members having upwardly extending knife projections along their separable and opposing edges and adapted to penetrate the recesses in the egg supporting members whereby upon the egg supporting members being depressed with an egg, the egg will be penetrated, said separable members having projections, a release member pivoted upon said bottom handle frame and spring urged toward the projections on the separable members to normally retain the separable members against outward displacement while depressing the egg, tension spring means extending between the separable members to normally hold the same together, a pusher plate frame pivoted to the bottom handle frame and having a curved pusher plate adapted to engage with the egg, said pusher plate having a portion engageable with the release device to release the separable parts upon depressing the pusher plate downwardly and after the egg shell has been penetrated by the knife projections.

References Cited in the file of this patent

UNITED STATES PATENTS

| 1,765,491 | Jones | June 24, 1930 |
| 2,031,294 | Young et al. | Feb. 18, 1936 |
| 2,076,440 | Amon | Apr. 6, 1937 |